United States Patent [19]

Shimizu et al.

[11] Patent Number: 4,495,084

[45] Date of Patent: Jan. 22, 1985

[54] PLASTIC SCINTILLATOR

[75] Inventors: Tohru Shimizu, Noda; Junji Nakagawa, Ichikawa, both of Japan

[73] Assignee: Kyowa Gas Chemical Industry Co., Ltd., Tokyo, Japan

[21] Appl. No.: 408,452

[22] Filed: Aug. 16, 1982

[30] Foreign Application Priority Data

Aug. 17, 1981 [JP] Japan .................. 56-127750

[51] Int. Cl.³ .............................................. G01T 1/20
[52] U.S. Cl. ................................................. 252/301.17
[58] Field of Search ................................... 252/301.17

[56] References Cited

U.S. PATENT DOCUMENTS 3,010,908 11/1961 Broderick et al. ............. 252/301.17
3,150,101 9/1964 Heimbuch ...................... 252/301.17
4,127,499 11/1978 Chen et al. ..................... 252/301.17

FOREIGN PATENT DOCUMENTS 1440583 6/1976 United Kingdom .

Primary Examiner—John F. Niebling

Attorney, Agent, or Firm—Gordon W. Hueschen

[57] ABSTRACT

A plastic scintillator which comprises using as the matrix resin thereof a copolymer obtained by polymerizing (a) at least one compound represented by the general formula I:

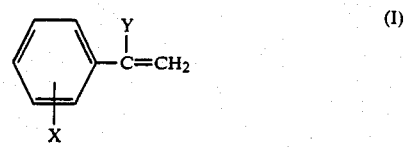

wherein, X and Y independently denote hydrogen atom or methyl group, providing that they do not exclusively denote methyl group, or a monomer mixture containing at least one compound of the general formula I in a weight proportion of at least 0.4 to the polymerizable monomer mixture to be used in the presence of (b) at least one monomer having at least two carbon-carbon double bonds capable of radical polymerization in the molecular unit thereof.

19 Claims, No Drawings

PLASTIC SCINTILLATOR

BACKGROUND OF THE INVENTION

1. Field of the Invention

This invention relates to a plastic scintillator. To be more particular, this invention relates to a plastic scintillator which possesses improved physical properties.

2. Description of Prior Arts

When radiations comprising electrically charged particles such as α-rays and β-rays penetrate a certain substance, they ionize, excite or dissociate atoms or molecules of the substance at the cost of their energy. On the other hand, the energy thus lost by the radiation and accumulated in the substance is either converted into energy of the form of thermal movement or just emitted in the form of electromagnetic waves. Particularly when the substance so penetrated by the radiation is fluorescent or phosphorescent, a fair portion of the excited energy is emitted in the form of light of a wavelength in the visible zone. This phenomenon of light emission is called "scintillation". Also in the case of radiation comprising γ-rays and neutron rays which are devoid of electric charge, a similar phenomenon is induced by the action of secondary charged particles which are emitted when the radiation interact with a substance. Generally, therefore, this phenomenon is widely utilized for the detection of radiation.

Substances capable of causing the scintillation are generally called scintillators. Examples of scintillators are inorganic crystals represented by sodium iodide activated with thallium, organic crystals represented by anthracene, organic solutions represented by xylene solution of terphenyl and plastic scintillators represented by terphenyl-polystyrene. These substances are extensively used as luminous bodies for the detection of radiation. Among other scintillators, particularly plastic scintillators are easy to handle and are readily moldable in desired, large shapes and, owing to these merits, have come to find utility as indispensable devices in the field of researches on cosmic rays and researches on high-energy physics by use of particle accelerators. In recent years in the field of researches on high-energy physics, development of large particle accelerators has increased demand for a great quantity of large plastic scintillators. In the properties which are expected from such plastic scintillators, high processibility has now become an important requirement besides those basic properties of scintillators in general which are represented by amount of emission and transparency.

The transparent resins heretofore used in plastic scintillators have been limited to styrene-based resins such as, for example, polystyrene and polyvinyl toluene. The plastic scintillators using these resins as their matrix resin have suffered from the disadvantage that the resins themselves are expensive and they are deficient in processibility. For example, such a plastic scintillator more often than not utilizes the whole reflection of light on the inner surfaces thereof to permit effective transfer of the light generated therein to a detector such as a photo-multiplier tube. The plastic scintillator, therefore, is generally used in a highly polished state. The plastic scintillator which uses the conventional styrene-based resin, however, is liable to sustain cracks when it is polished. When the scintillator is wiped with a solvent such as alcohol to have its surface cleaned, it tends to sustain cracks while in use. Because of such defective physical properties as described above, the conventional styrene-based plastic scintillators, despite the outstanding merit of high emission efficiency, call for advanced skill and great toil on the part of users engaging in the work of polishing and handling these plastic scintillators. In applications which demand heavy consumption of large plastic scintillators, therefore, the conventional styrene-based plastic scintillators have not necessarily proved quite practical.

To overcome the drawbacks mentioned above, plastic scintillators using inexpensive acrylic resin as matrix resin have been developed in recent years. Unlike styrene-based resins acrylic resin itself is not a scintillator. These plastic scintillators, therefore, have a fatal disadvantage that they are deficient in the emission efficiency which constitutes the basic property for plastic scintillators. This particular disadvantage is corrected to some extent by having a scintillating substance such as, for example, naphthalene or styrene dissolved in a high concentration in the acrylic resin [Nuclear Instruments and Methods 169, 57–64(1980)]. Since the improved scintillators contain the scintillating substance in a high concentration, they are inevitably deprived of the outstanding mechanical properties inherent in acrylic resin. Generally as the scintillating substance to be contained in a high concentration in the acrylic resin, naphthalene is used in an amount of 1 to 15% by weight in due consideration of solubility and cost. Plastic scintillators incorporating naphthalene have a disadvantage that the time for the attenuation of light which ensues from the penetration of the scintillators by radiation is long, i.e. the response of the scintillators to the radiation is slow. These drawbacks restrict the range of applications found for the plastic scintillators using acrylic resin as their matrix resin.

An object of this invention, therefore, is to provide a novel plastic scintillator. Another object of this invention is to provide a novel plastic scintillator which favorably compares with the conventional styrene-based plastic scintillators in the basic properties of plastic scintillators represented by emission efficiency, transparency and response time and possesses outstanding practical properties.

SUMMARY OF THE INVENTION

The objects described above are accomplished by a plastic scintillator which comprises using as the matrix resin thereof a copolymer obtained by polymerizing (a) at least one compound represented by the general formula I:

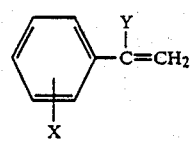

(I)

wherein, X and Y independently denote hydrogen atom or methyl group, providing that they do not exclusively denote methyl group, or a monomer mixture containing at least one compound of the general formula I in a weight proportion of at least 0.4 to the polymerizable monomer mixture to be used in the presence of (b) at least one monomer having at least two carbon-carbon double bonds capable of radical polymerization in the molecular unit thereof.

The plastic scintillator of the present invention contains a styrenic unit as the matrix resin thereof and the resin itself, therefore, is a scintillator. It provides amply amount of emission without requiring the addition of a large amount of a scintillating substance, e.g., naphthalene, which is indispensable to plastic scintillators using acrylic resin as the matrix resin. Consequently, it enjoys a notable correction of the length of the time of attenuation which constitutes one of the aforementioned drawbacks of plastic scintillators using acrylic resin as the matrix resin. Besides, since this plastic scintillator has a higher refractive index than acrylic resin, it has an advantage that the extraction of the light generated within the scintillator by total reflection of the light upon the inner surface of the scintillator is accomplished with high efficiency.

Moreover, since the plastic scintillator of the present invention possesses a structure in which the matrix resin is cross-linked, it far excels the conventional styrene-based plastic scintillators in terms of practical properties represented by processibility, resistance to solvents, and thermal resistance. Another advantage enjoyed by the plastic scintillator of the present invention is that this plastic scintillator is excellent in resistance to radiation. Because of their function, plastic scintillators in use are constantly exposed to radiation. The resistance to radiation, therefore, forms one important attribute. Generally, transparent plastics gradually gain in coloration and gradually lose mechanical strength in proportion as the dosage of radiation increases. They are eventually disintegrated. Styrene-based resins sustain injuries done by radiation notably lightly as compared with acrylic resin. This fact, as evaluated in terms of the quality of a plastic scintillator, implies that in the plastic scintillator of the present invention, the time-course degradation of transparency during service, i.e. the time-course decrease of the amount of light extractable from the plastic scintillator, is notably smaller than in the plastic scintillator using acrylic resin as the matrix resin.

PREFERRED EMBODIMENT OF THE INVENTION

Concrete examples of the monomer of the aforementioned general formula I are styrene, vinyl toluene and α-methyl styrene. From the standpoint of performance, no particular preference is given to any one of them over the rest. From the standpoint of ease of acquisition and economy, styrene is preferred to the others. The concentration of the monomer of the aforementioned general formula I in the monomer mixture to be used in the manufacture of the matrix resin according to the present invention has close bearing upon the emission efficiency. For the fixed amount of the scintillating substance to be incorporated, the emission efficiency increases with the increasing concentration of the aforementioned monomer. In order for the produced plastic scintillator to acquire a high emssion efficiency, therefore, this concentration is desired to be as high as is practicable. The plastic scintillator produced has the highest emission efficiency when there is used a monomer mixture which comprises a monomer (cross-linker) having at least two carbon-carbon double bond and a monomer of the aforementioned general formula I only. The degree of the increase of the emission efficiency due to the increase in the concentration of the aforementioned monomer is relatively small when the weight proportion of this monomer in the monomer mixture is 0.4 or over. The degree is still smaller when the weight proportion is 0.7 or over. Where the produced plastic scintillator is required to enjoy good practical properties and high economy in addition to high emission efficiency, for example, one or more monomers copolymerizable with the aforementioned monomer may be used in combination with the aforementioned monomer.

The copolymerizable monomer to be used in combination with the aforementioned monomer is not specifically limited insofar as use of the additive monomer does not depart from the spirit of this invention. In due consideration of the transparency and the practical properties of the produced matrix resin, however, this additive monomer is desired to be an acrylate or methacrylate of an alkanol of one to four carbon atoms. Typical examples of such acrylates and methacrylates are methyl methacrylate, isopropyl methacrylate, n-butyl methacrylate, methyl acrylate, ethyl acrylate, isopropyl acrylate and n-butyl acrylate. In this case, the weight proportion of the monomer of the aforementioned general formula I in the monomer mixture destined to form the copolymer which is the matrix resin is determined in accordance with the intended use of the matrix resin and as balanced with the emission efficiency and the other properties. In any event, however, the weight proportion is required to be at least 0.4, preferably at least 0.7. If the weight proportion is less than 0.4, it becomes necessary to incorporate in the monomer mixture a large amount of a scintillating substance so as to keep the emission efficiency beyond a practical level. Use of such a large amount of the scintillating substance is not economical.

The kind and the amount of addition of the monomer (cross-linker) having at least two carbon-carbon double bonds capable of radical polymerization within the molecular unit have substantially no limitations. They may be suitably selected to satisfy desired properties within range in which the transparency of the produced plastic scintillator is not sacrificed. The monomer is desired to be of a type having two carbon-carbon double bonds capable of radical polymerization in the molecular unit. Particularly desirable example of the cross-linker are compounds represented by the general formula II:

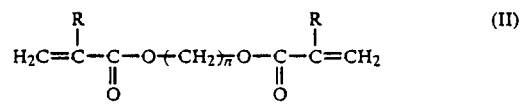

wherein, R denotes hydrogen atom or methyl group and n an integer of the value of 3 to 8, preferably 3 to 6, the general formula III:

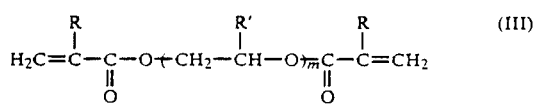

wherein, R and R' independently denote hydrogen atom or methyl group and m denotes an integer of the value of 1 to 23, preferably 1 to 9, and the general formula IV:

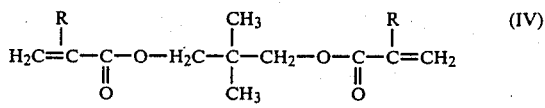

wherein, R denote hydrogen atom or methyl group.

Typical cross-linkers are 1,3-propanediol diacrylate, 1,4-butanediol diacrylate, 1,6-hexanediol diacrylate, 1,3-propanediol dimethacrylate, 1,4-butanediol dimethacrylte, 1,6-hexanediol dimethacrylate, ethylene glycol diacrylate, diethylene glycol diacrylate, triethylene glycol diacrylate, propylene glycol diacrylate, dipropylene glycol diacrylate, tripropylene glycol diacrylate, ethylene glycol dimethacrylate, diethyelene glycol dimethacrylate triethylene glycol dimethacrylate, propylene glycol dimethacrylate, dipropylene glycol dimethacrylate, tripropylene glycol dimethacrylate, neopentyl glycol diacrylate, neopentyl glycol dimethacrylate, pentaerythritol tetraacrylate, pentaerythritol tetramethacrylate, glycerin triacrylate, glycerin trimethacrylate, diallyl phthalate and divinyl benzene, for example. Of these compounds, the compounds represented by the aforementioned general formulas II, III and IV are especially desirable in consideration of the effect in the improvement of practical properties represented by processibility, resistance to solvents, and thermal resistance and of the transparency of the produced matrix resin.

When one of the compounds represented by the general formulas is used as the cross-linker, the amount of addition of this compound is generally desired to fall in the range of 0.001 to 0.1, preferably 0.001 to 0.05, in the weight proportion to the monomer mixture, although it is variable from one kind to another of the cross-linker to be used. If the weight proportion is less than 0.001, the effect in the improvement of properties is less than is expected. The effect in the improvement is generally saturated when the weight proportion is 0.1. Addition of the cross-linker in an amount beyond this value is not economical. Moreover, such an excess addition has a disadvantageous outcome that the produced matrix resin will possibly be deficient in transparency.

The plastic scintillator obtained by the present invention substantially does not necessarily require incorporation of any scintillating substance. Practically, for the light of scintillation generated to be effectively detected by the photomultiplier tube, the plastic scintillator generally is expected to incorporate a scintillating substance. For this purpose, there may be added a known scintillating substance such as, for example, paraterphenyl, 2,5-diphenyl oxazol or 2-(4-tertiary-butylphenyl)-5-(4-biphenylyl)-1,3,4-oxadiazole. The addition can enhance the effect of emission. The amount of addition of this scintillating substance, though not particularly limited, may be suitably selected to meet the intended purpose within the range of the solubility in the matrix resin of the scintillator of this invention. This amount, though variable with the particular kind of scintillating substance to be used, is generally selected in the range of 0.1 to 5% by weight, preferably 0.1 to 3% by weight. If the amount is less than 0.1% by weight, then the effect of the addition is not sufficient. If the amount exceeds 5% by weight, the addition itself proves disadvantageous economically and it possibly brings about insufficiency of the amount of emission due to the so-called concentration quenching.

The light generated within the plastic scintillator is generally detected by a photomultiplier tube. In order for the wavelength of the light from the scintillator to conform to the wavelength at which the photomultiplier tube in use exhibits its highest sensitivity, the plastic scintillator may incorporate therein a scintillating substance such as, for example, 1,4-bis-2-(5-phenyloxazolyl)-benzene, 2,5-bis-2-(5-tertiary-butylbenzoxazolyl)-thiophene, 1,4-bis-(2-methylstyryl)-benzene or 4,4-bis-(2,5-dimethylstyryl)-benzene. This incorporation of the scintillating substance for the conformation of wavelength mentioned above, of course, is embraced by the present invention. The amount of addition of such a second scintillating substance, thought not particularly limited, is desired to be selected in the range of 0.001 to 0.1% by weight, preferably 0.005 to 0.05% by weight, with due consideration of the transparency of the produced scintillator and the economy of the manufacture.

The method to be used for the manufacture of the plastic scintillator of the present invention is not specifically limited. Generally, the plastic scintillator can be obtained in a desired shape such as, for example, in the shape of a plate, by a method which comprises the steps of dissolving a radical polymerization initiator in the monomer mixture of the stated composition, optionally further adding a desired scintillating substance and dissolving it in the monomer mixture, casting the resultant molten mixture in a mold such as is formed between two opposed glass plates, and polymerizing the cast mixture in the mold. This reaction is carried out generally at temperatures of 0° to 150° C., preferably 30° to 140° C., for a period of 0.5 to 100 hours, preferably 1 to 50 hours. The radical polymerization initiator is generally used in an amount of 0.0001 to 1% by weight, preferably 0.0005 to 0.1% by weight, based on the monomer mixture. Typical examples of the radical polymerization initiator are lauroyl peroxide, tert-butyl peroxyisopropyl carbonate, benzoyl peroxide, dicumyl peroxide, tert-butyl perproxyacetate, tert-butyl peroxybenzoate, di-tert-butyl peroxide and azo-bis-isobutylonitrile.

The plastic scintillator which is manufactured by other than the method described above is embraced by the present invention on condition that it does not depart from the scope of the present invention.

Now, this invention will be described in further detail below with reference to the working examples of the invention.

EXAMPLES 1–4 AND CONTROLS 1–3

To a monomer mixture of a varying composition shown in Table 1, 0.5% by weight of lauroyl peroxide was added as a polymerization initiator. The resultant mixture was cast in a cell formed between two opposed glass sheets and heated at 65° C. for 36 hours and then at 80° C. for 5 hours. It was further heated at 120° C. for 3 hours, to produce a plastic plate about 10 mm in thickness. The plastic plate was tested for various properties by the methods shown in Table 1. The results are shown in Table 1.

From these results, it is noted that the matrix resin had its crack resistance and mechanical and thermal properties represented by tensile strength and deflection temperature under load notably improved by incorporation therein of a cross-linked structure. Besides, the resins of Examples 1–3 notably excelled those of control 3 in resistance to radiation.

TABLE 1

| Test Piece | Monomer composition (% by weight) Cross-linker | Monomer other than cross-linker | Tensile strength (kg/cm²) ASTM D636 | Rockwell hardness (M-scale) ASTM D785 | Izod impact strength (kg · cm/cm) ASTM D785 | Deflection temperature under load* (°C.) ASTM D648 | Resistance to radiation* Retention of bending strength (%) ASTM D790 | Color difference ΔE (Lab) JIS Z8730 | Resistance to cracks** (Time-course change of polished surface) |
|---|---|---|---|---|---|---|---|---|---|
| Example 1 | AHD 2 | Styrene 98 | 660 | 81 | 2.2 | 95 | 96 | 11 | o |
| Example 2 | NPG 1 | Styrene 49.5 MMA 49.5 | 730 | 85 | 2.1 | 96 | 79 | 22 | o |
| Example 3 | NPA 1 | Vinyl toluene 99 | 350 | 88 | 2.0 | 78 | 91 | 15 | o |
| Example 4 | P9G 4 | Styrene 96 | 550 | 80 | 2.2 | 90 | 98 | 12 | o |
| Control 1 | — | Styrene 100 | 500 | 84 | 1.2 | 82 | 105 | 11 | x |
| Control 2 | — | Vinyl toluene 100 | 260 | 89 | 1.9 | 73 | 89 | 15 | x |
| Control 3 | — | MMA 85 Naphthalene 15 | 490 | 64 | 2.4 | 55 | <5 | 35 | — |

AHD: 1,6-Hexanediol diacrylate, NPG: Neopentyl glycol dimethacrylate, NPA: Neopentyl glycol diacrylate,
P9B: Polypropylene glycol (nonamer) dimethacrylate, MMA: Methyl methacrylate
*Maximum Stress - 264 psi
**Change of color after irradiation of $5 \times 10^7$ R of Co 60 γ-rays
***Change on polished surface after one week of daily temperature cycles of 8 hours' standing at 70° C. and 16 hours' standing at room temperature, respectively at humidity of 100%: Scale of rating - o Complete absence of change or occurrence of very slight cracks and x occurrence of heavy cracks.

EXAMPLES 5-11 AND CONTROLS 4-6

Monomer mixtures of the same compositions as used in Examples 1-4 and Controls 1-3, with varying scintillating substances added thereto as indicated in Table 2, were processed by the procedure adopted in Examples 1-4 and Controls 1-3, to produce plate-shaped plastic scintillators about 10 mm in thickness.

A rectangular test piece 40 mm×20 mm was cut from each of the plastic scintillators obtained as described above. After the cut surfaces had been polished, the test piece was applied fast to the window of a photomultiplier tube, Type 56AVP, made by Phillips Corp. with the aid of a silicone oil. The test piece as attached to the photomultiplier tube was concealed from light by being wholly stowed in an aluminum tube 1 mm in thickness containing an aluminum window 0.1 mm in thickness. The photomultiplier tube was connected to a multichannel analyzer. The β-rays from Sr 90 were monochromatized by means of a spectrometer, to extract β-rays having 1.6 MeV of energy. The test piece of plastic scintillator was irradiated with these β-rays. The generated light of scintillation was analyzed for wave height to determine the emission efficiency of the plastic scintillator was reported as the anthracene efficiency calculated by using as the reference the value of wave height measured for a plastic scintillator of known anthracene efficiency under identical conditions. The results are shown in Table 2.

When test pieces were cut with a circular saw, the plastic scintillators obtained in Control 4 and 5 became too viscous to be cut without difficulty and those obtained in Examples 5-11 could be cut very easily. When polished with buff, the plastic scintillators obtained in Controls 4-6 sustained numerous cracks in the polished surfaces. From these results, it is noted that plastic scintillators obtained according to this invention combined high emission efficiency and outstanding processability.

TABLE 2

| Test piece | Composition Monomer composition (parts by weight) | Scintillator composition (parts by weight) | Emission efficiency (anthracene efficiency, %) |
|---|---|---|---|
| Example 5 | Example 1 (99) | DPO(1.0), BDB(0.02) | 59 |
| Example 6 | Example 4 (98) | b-PBP(2-0), POPOP(0.01) | 70 |
| Example 7 | Example 2 (99) | b-PBP(1.0), BBOT(0.01) | 42 |
| Example 8 | Example 3 (98) | p-TP(2.0), bis-MSB(0.03) | 63 |
| Example 9 | Example 4 (97) | b-PBD(3.0), BDB(0.05) | 77 |
| Example 10 | Example 1 (99) | b-PBD(1.0), BDB(0.01) | 62 |
| Example 11 | Example 3 (99.5) | DPO(0.5), bis-MSB(0.02) | 52 |
| Control 4 | Control 1 (99.5) | DPO(0.5), BBOT(0.01) | 43 |
| Control 5 | Control 2 (99) | p-TP(1.0), BDB(0.01) | 56 |
| Control 6 | Control 3 (99) | b-PBD(1.0), POPOP(0.01) | 30 | p-TP: Para-terphenyl
b-POB: 2-(4-Tertiary-butylphenyl)-5-(4-biphenylyl)-1,3,4-oxadiazole
DPO: 2,5-Diphenyl oxazole
POPOP: 1,4-Bis-2-(5-phenyloxazolyl)-benzene
bis-MSB: 1,4-Bis-(2-methylstyryl)-benzene
BBOT: 2,5-Bis-(5-tertiary-butylbenzoxazoxazol4-2-yl)-thiophene
BDB: 4,4-Bis-(2,5-dimethylstyryl)-diphenyl
Examples 12-13 and Controls 7-8

Rectangular test pieces, 40 mm×20 mm, were cut one each from the plastic scintillators obtained in Example 6, Example 10 and Controls 5-6. After their cut surfaces were polished, they were irradiated with γ-rays from Co 60 until dosage of $10^6$ R. At the end of the irradiation, the test pieces of plastic scintillators were tested for emission efficiency to obtain the results shown in Table 3. It is noted from the results that the plastic scintillators obtained according to the present invention excelled in resistance to radiation.

TABLE 3

| Test piece | Plastic scintillator | Emission efficiency (Anthracene efficiency, %) | | Ratio of retention of efficiency (%) |
| --- | --- | --- | --- | --- |
| | | Before irradiation | After irradiation | |
| Example 12 | Example 6 | 70 | 63 | 90 |
| Example 13 | Example 10 | 62 | 52 | 84 |
| Control 7 | Control 5 | 56 | 42 | 75 |
| Control 8 | Control 6 | 30 | 8 | 27 |

What is claimed is:

1. A plastic scintillator in which a scintillating substance is incorporated in a matrix resin comprising a copolymer obtained by polymerizing a polymerizable mixture comprising at least 40 percent by weight of (a) at least one compound represented by the general formula I:

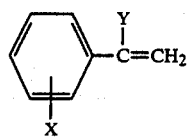  (I)

wherein, X and Y independently denote hydrogen atom or methyl group providing they do not exclusively denote methyl group, and a crosslinking amount of (b) at least one copolymerizable monomer possessed of two carbon-carbon double bonds capable of radical polymerization in the molecular unit thereof selected from the group consisting of compounds represented by the general formula II:

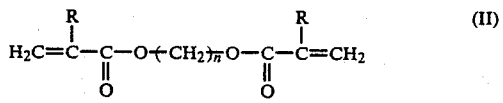  (II)

wherein, R denotes hydrogen atom or methyl group and n an integer of the value of 3 to 8; compounds represented by the general formula III:

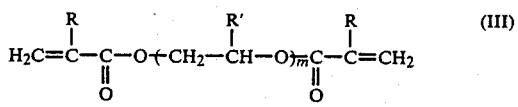  (III)

wherein, R and R' independently denote hydrogen atom or methyl group and m an intrger of the value of 1 to 23; and compounds represented by the general formula IV:

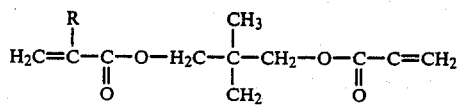  (IV)

wherein, R denotes hydrogen atom or methyl group.

2. A plastic scintillator according to claim 1, wherein the copolymerizable monomer has a weight proportion to the polymerizable mixture in the range of 0.001 to 0.1.

3. A plastic scintillator according to claim 1, wherein the polymerizable mixture of contains at least one copolymerizable monomer represented by the general formula I in a weight proportion of at least 0.7.

4. A plastic scintillator according to claim 1, wherein the copolymerizable monomer has a weight proportion to the polymerizable mixture in the range of 0.001 to 0.05.

5. A plastic scintillator according to claim 1, wherein the copolymerizable monomer is a compound represented by the general formula II.

6. A plastic scintillator according to claim 5, wherein n in the general formula II denotes an integer of the value of 3 to 6.

7. A plastic scintillator according to claim 1, wherein the copolymerizable monomer is a compound represented by the general formula III.

8. A plastic scintillator according to claim 7, wherein m in the general formula III denotes an integer of the value of 1 to 9.

9. A plastic scintillator according to claim 1, wherein the compound represented by the general formula I is styrene or vinyl toluene.

10. A plastic scintillator according to claim 1, wherein the copolymerizable monomer is an alkyl acrylate or methacrylate the alkyl moiety of which has 1 to 4 carbon atoms.

11. A plastic scintillator according to claim 10, wherein the methyl methacrylate is methyl methacrylate.

12. A plastic scintillator according to claim 6, wherein the copolymerizable monomer is 1,6-hexanediol diacrylate.

13. A plastic scintillator according to claim 8, wherein the copolymerizable monomer is polypropylene glycol dimethacrylate.

14. A plastic scintillator according to claim 1, wherein the copolymerizable monomer is neopentylglycol diacrylate or dimethacrylate.

15. A plastic scintillator according to claim 1, wherein the content of scintillating substance is 0.1 to 5% by weight.

16. A plastic scintillator according to claim 1, wherein the scintillating substance is selected from the group consisting of paraterphenyl, 2,5-diphenyl oxazole and 2-(4-tertiary-butylphenyl)-5-(4-biphenylyl)-1,3,4,-oxadiazole.

17. A plastic scintillator according to claim 1 further containing a secondary scintillating substance.

18. A plastic scintillator according to claim 17, wherein the content of the secondary scintillating substance is 0.005 to 0.05% by weight.

19. A plastic scintillator according to claim 17, wherein the secondary scintillating substance is selected from the group consisting of 1,4-bis-2-15-phenyloxazolyl)-benzene, 2,5-bis-2-15-tertiary-butylbenzoxazolyl)-thiophene, 1,4-bis-(2-methylstyryl)-benzene and 4,4-bis-(2,5-dimethylstyryl)-benzene.

* * * * *

UNITED STATES PATENT AND TRADEMARK OFFICE
CERTIFICATE OF CORRECTION

PATENT NO. : 4,495,084
DATED : January 22, 1985
INVENTOR(S) : Tohru Shimizu and Junji Nakagawa It is certified that error appears in the above—identified patent and that said Letters Patent is hereby corrected as shown below:

Col. 8, line 56; (line 6 of Table 2's footnote), Change "-butylbenzoxazoxazol4-2-yl)-" to -- -butylbenzoxazol4-2-yl)- --

Signed and Sealed this

Seventeenth Day of September 1985

[SEAL]

Attest:

Attesting Officer

DONALD J. QUIGG

Commissioner of Patents and Trademarks—Designate